UNITED STATES PATENT OFFICE.

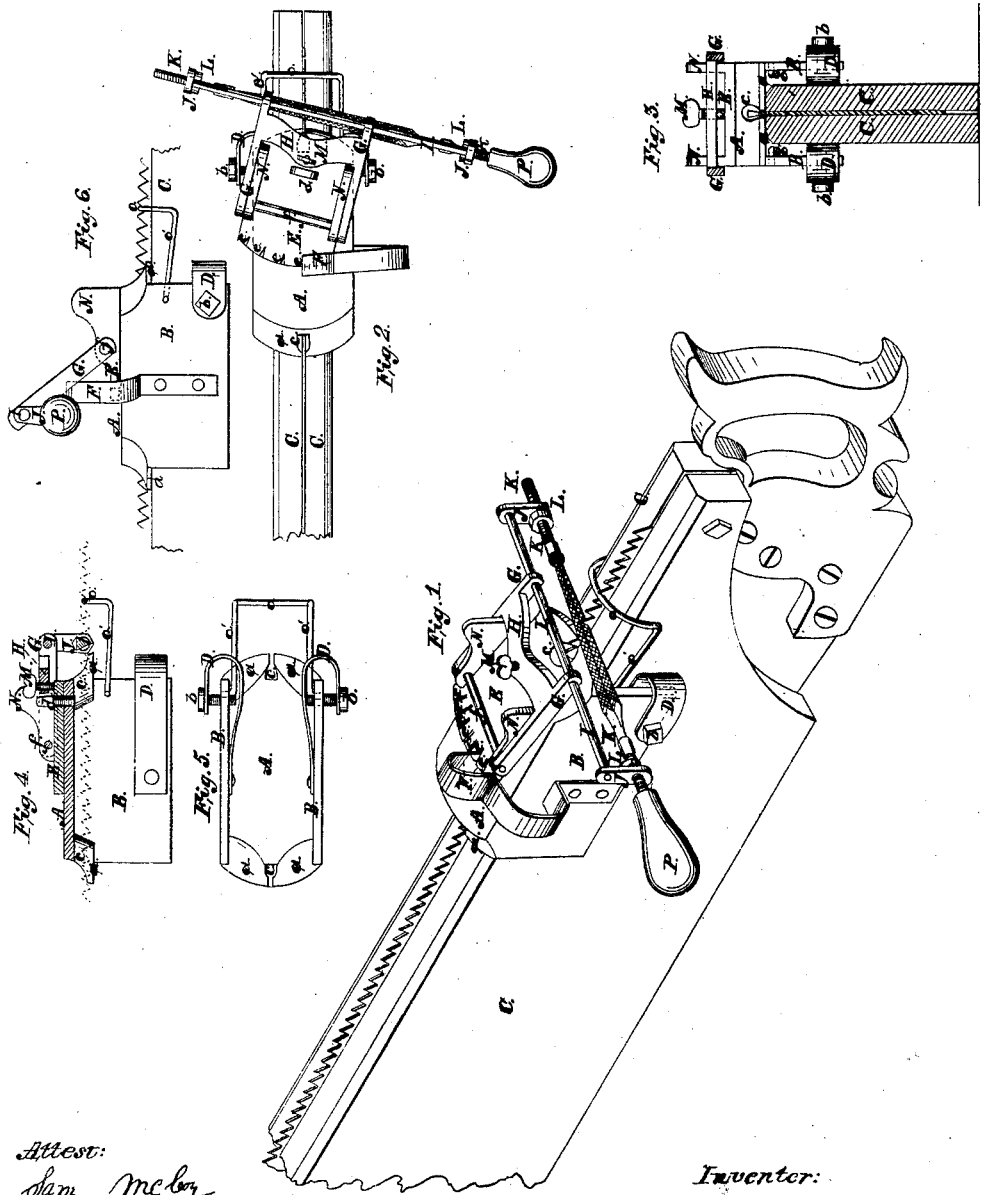

ABNER M. BEARDSLEY, OF ELKHART, INDIANA.

MACHINE FOR FILING SAWS.

Specification of Letters Patent No. 23,655, dated April 19, 1859.

*To all whom it may concern:*

Be it known that I, ABNER M. BEARDSLEY, of the town of Elkhart, in the county of Elkhart and State of Indiana, have invented certain new and useful Improvements in Implements for Filing Hand and other Saws; and I do hereby declare the following to be a full, clear, and exact description thereof, reference being had to the accompanying drawing of the same, making part of this specification, in which—

Figure 1, represents a view in perspective of my improved implement, as applied to a hand saw. Fig. 2, represents a plan or top view, and Fig. 3, a transverse section of the implement just in rear of the file. Fig. 4, represents a vertical longitudinal section of the implement, detached from the clamp. Fig. 5, represents a view of the bed-plate turned bottom-side uppermost, and Fig. 6, a side elevation, showing the hinged frame with its file carriage, swung back, and supported against the spring detent, of the adjusting plate.

In the accompanying drawing A, represents a horizontal bed-plate, upon which the several parts for supporting and adjusting the file, are mounted. It is furnished with a seat $a$ at each end, which rests on the top of the saw clamp, and supports the bed-plate A, a sufficient distance above the clamp, to clear the teeth of the saw, as the implement is moved over them. Two side plates B, project from the bed-plate in such manner as to embrace the saw clamp, a portion of the latter only, being shown in the drawing.

The saw clamp C, does not fill the entire space between the side plates B; but sufficient room is left for the action of a spring D, between the clamp and each side plate. Each spring D, has one end riveted to the inner side, while its outer end is bent into a U shape so as to overlap the outer side of said plate B. A screw $b$ passes through the bent end of each spring into the plates, for adjusting the springs so as to bear against the sides of the clamp, with sufficient force to hold the implement in its proper position during the operation. It is not the purpose however, of these screws to clamp the implement so that it cannot be slid from one tooth to another, without having to unclamp them, as that would consume too much time, and is moreover, very inconvenient; but to support and steady the implement laterally, upon the clamp, while a hinged detent, hereafter to be described, prevents any end movement, during the operation of filing.

The saw is placed in the clamp, so that its teeth project uniformly above it, and secured by screw-bolts. In order therefore, to allow the bed-plate to rest and slide upon the clamp, it is necessary that the seats $a$ should have openings $c$ through which the teeth of the saw can pass. These openings are wider at the top, than at the base of the seats, to allow the teeth with their set, to pass through them, without being injured while moving the implement over them.

Upon the front portion of the bed-plate, is secured, by means of a pivot screw $d$, a horizontal adjusting plate E, for setting and maintaining the proper angle of the file, in relation to the saw, by turning the plate upon its pivot $d$, either to the right or left. The adjustment of the plate E, is governed by means of a scale, formed of a series of notches $e$ in the rear edge of the plate, into any one of which, a spring detent F, rising from the side plate B, takes and holds the plate in the position in which it is set. These notches $e$ therefore, while they serve to govern the angle of the file, also serve, in connection with the spring detent, to hold the plate from changing its position, so long as the file is required to be used at any particular angle.

Upon the adjusting plate E, is secured a horizontal frame, consisting of two arms G, and a front cross plate H. The rear ends of these arms are secured to a bolt $f$, which serves as a hinge on which the frame is free to rise and fall. The front ends of these arms extend beyond the bed-plate, and are pierced with round holes to receive and guide a horizontal rod I, which carries at each end, a pendent arm J, which support and carry the file holders K.

The file holders resemble the shanks of screws, screwed into, and through holes in the lower ends of said arms J, having sockets in their adjacent ends, to receive and hold the ends of the file. By thus making the file holders of screw shanks, they may be readily and conveniently screwed nearer to, or farther from each other, for adjusting them to different lengths of files; for clamping the file firmly in the sockets, and for allowing the file, to be loosely supported in the sockets, so that it will be free to turn therein, to adjust itself to the shape of the teeth being filed. When the file is properly set, the holders are locked to the arms J, by the clamp nuts L.

Supporting the file carriage in the projecting end of a horizontal frame, hinged at its opposite end, permits the file to rise and fall while being reciprocated, to conform to the taper of the file. It also admits of a simple mode of limiting the descent of the file, and thereby maintaining a proper gage for the saw teeth. This is effected by an adjusting screw M, which passes through the middle of the front cross bar H, and rests upon the front end of the adjusting plate E, as shown in Figs. 3 and 4, when the tooth has been filed to the proper depth. By turning the thumb screw to the right or left, the gage of the teeth may be set;—because the file can descend no farther, when the point of the screw rests upon the pivoted plate. The rising and falling of the hinged frame, to conform to the taper of the file, it is clear cannot interrupt or interfere with the proper action of the gaging screw. Neither can the lateral adjustment to vary the angle of the file, affect the position of the gaging device.

This arrangement of the hinged frame, it will be seen, also allows it to be swung back over the bed-plate, upon its hinge, and supported against the spring detent F, in such manner as to hold the file entirely out of the way of the teeth as shown in Fig. 6, when adjusting the implement to the clamp, or removing it therefrom, to reverse its position. This is a very great advantage in handling and adjusting the implement, as it relieves the operator of much trouble, and prevents injury to the teeth.

As the file carriage is reciprocated by the hand of the operator, the pendent arms J, are liable to strike against the projecting ends of the hinged frame with considerable force, which would soon break or work the hinge loose. To prevent this, a cheek plate N, is mounted upon the pivoted plate E, adjacent to the inside of each arm G, so as to support the hinged plate G, H, against the lateral blows of the file carriage.

In filing, the implement is moved upon the clamp by hand, from one end of the saw, to the other. During this operation the operator is liable to miss or skip some of the teeth, which would render the saw imperfect. To remedy this evil, I have arranged an indicator O, so as to project in front of the implement, having its arms O' hinged to the side plates B, and its bow or arched end O, curving, so as to pass over the clamp, and rest by its weight in the notches of the teeth. When one tooth is filed, it is only necessary to lift the indicator above the teeth, while the file is moved to the next or alternate tooth. In this way, the sliding movement of the implement will be governed so as to prevent skipping any of the teeth. This indicator hinged to the implement and resting in the notches of the saw serves as a detent, to hold the file properly in the notch, during the operation of filing; because as before stated, the side springs are only screwed against the clamp with sufficient force to hold the implement steady and allow it to be moved over the teeth, without having to unclamp and reclamp the screws, every time the implement is moved.

In sharpening cross cut saws, every tooth may be filed without changing the implement, by turning the adjusting plate so as to present the file at the proper angle for each tooth. I prefer however, to file every other tooth in one direction of the saw, and then by reversing the position of the implement on the clamp, and the angle of the file, finish the remaining teeth; whereby the feather edge of every alternate tooth, will be on opposite sides of the saw.

If it should be required however, as in filing saws for slitting, the implement can be adjusted by the holding springs D, so as to incline it to either side of the saw, by screwing up one spring, and unscrewing the other in which case the spring detent F, is placed in the central notch $e'$ so as to hold the file at right angles to the saw, whereby the back of the tooth is filed with a bevel, and square on the front or cutting edge.

In the drawing I have shown the implement as applied to a hand saw, but it is equally applicable to mill saws.

P is the handle by which the operator reciprocates the file.

Having described the operation of the implement in connection with the description of the construction of the same, I will now point out the new element, and arrangements of parts contained therein.

I do not claim a swinging frame, either for supporting the file, or the file carriage. Neither do I claim lifting the swinging frame, and file, so as to clear the teeth of the saw, by means of a spring, or any other device, so that the saw can be fed beneath the file, as each tooth is sharpened; but

I claim and desire to secure by Letters Patent:—

1. The arrangement of the swinging frame of the file-carriage upon the adjusting plate E, so that it can be turned over, and supported upon the bed plate A, in the manner and for the purposes described and shown in Fig. 6, of the drawings.

2. The arrangement of the cheek pieces N, upon the adjusting plate E, between the arms of the swinging frame, for the purpose of bracing the latter against the thrusts of the file-carriage, while said frame is free to rise and fall, as described.

3. The arrangement of the gaging screw

M, in the cross piece H, of the swinging frame, by which the teeth are filed to a uniform depth, without interfering with the rising of the file-carriage to conform to the taper of the file, as described.

4. The arrangement of the seats $a\ a$ at each end of the bed-plate A, whereby the implement may be supported directly upon the clamp of the saw, for the purposes described.

In testimony whereof I have hereunto subscribed my name.

ABNER M. BEARDSLEY.

Witnesses:
HENRY CROMPTON,
SAM McCOY.